US012119553B2

(12) United States Patent
Koga et al.

(10) Patent No.: US 12,119,553 B2
(45) Date of Patent: Oct. 15, 2024

(54) ANTENNA DEVICE AND ELECTRONIC EQUIPMENT

(71) Applicant: FCNT LIMITED, Yamato (JP)

(72) Inventors: Yohei Koga, Yamato (JP); Yasumitsu Ban, Yamato (JP); Manabu Yoshikawa, Yamato (JP)

(73) Assignee: FCNT LLC, Yamato (JP)

(*) Notice: Subject to any disclaimer, the term of this patent is extended or adjusted under 35 U.S.C. 154(b) by 136 days.

(21) Appl. No.: 18/075,571

(22) Filed: Dec. 6, 2022

(65) Prior Publication Data

US 2023/0098428 A1 Mar. 30, 2023

Related U.S. Application Data

(63) Continuation of application No. PCT/JP2020/022732, filed on Jun. 9, 2020.

(51) Int. Cl.
*H01Q 21/00* (2006.01)
*H01Q 13/08* (2006.01)

(52) U.S. Cl.
CPC ....... *H01Q 21/0075* (2013.01); *H01Q 13/085* (2013.01)

(58) Field of Classification Search
CPC ...... H01Q 1/2291; H01Q 1/243; H01Q 5/307; H01Q 5/35; H01Q 9/30; H01Q 9/42; H01Q 13/10; H01Q 13/085; H01Q 21/0075
See application file for complete search history.

(56) References Cited

U.S. PATENT DOCUMENTS

2015/0092623 A1 4/2015 Svendsen et al.
2017/0250475 A1* 8/2017 Liu ........................ H01Q 21/30
2018/0287259 A1 10/2018 Svendsen et al.

FOREIGN PATENT DOCUMENTS

DE 102013110795 A1 4/2015
JP 2002-064320 A 2/2002
WO 2016/103859 A1 6/2016
WO 2018/183336 A1 10/2018

OTHER PUBLICATIONS

International Search Report dated Sep. 8, 2020, issued in counterpart Application No. PCT/JP2020/022732. (2 pages).

* cited by examiner

*Primary Examiner* — Hoang V Nguyen
(74) *Attorney, Agent, or Firm* — WHDA, LLP

(57) ABSTRACT

An antenna device includes a first antenna having a length corresponding to a first frequency, and arranged along a ground, a second antenna formed by a slot penetrating metal constituting the first antenna, and having a slot length corresponding to a second frequency higher than the first frequency, a first feeder wire for the first frequency, connected from the ground to the first antenna, a metal element for electromagnetic field coupling, arranged in a non-contact state relative to the second antenna, between the slot and the ground; and a second feeder wire for the second frequency, connected from the ground to the metal element.

13 Claims, 14 Drawing Sheets

ANTENNA DEVICE AND ELECTRONIC EQUIPMENT

CROSS-REFERENCE TO RELATED APPLICATION

This application is a continuation application of International Application PCT/JP2020/022732 filed on Jun. 9, 2020 and designated the U.S., the entire contents of which are incorporated herein by reference.

FIELD

The present invention relates to an antenna device and electronic equipment.

BACKGROUND

In recent years, various antennas have been used in electronic equipment as a result of further development of wireless communication technologies (see, for example, Patent Document 1 and Patent Document 2).

PATENT DOCUMENT

[Patent document 1] Japanese Laid-open Patent Publication No. 2002-64320
[Patent document 2] International Publication Pamphlet No. WO 2016/103859

SUMMARY

An aspect of the disclosed technology is illustrated by the following antenna device. The antenna device includes: a first antenna having a length corresponding to a first frequency, and arranged along a ground; a second antenna formed by a slot penetrating metal constituting the first antenna, and having a slot length corresponding to a second frequency higher than the first frequency; a first feeder wire for the first frequency, connected from the ground to the first antenna; a metal element for electromagnetic field coupling, arranged in a non-contact state relative to the second antenna, between the slot and the ground; and a second feeder wire for the second frequency, connected from the ground to the metal element.

Further, an aspect of the disclosed technology is illustrated by electronic equipment including the above antenna device.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

For example, in the case of mobile terminals like smart phones, a plurality of types of antennas having different frequency bands are incorporated in some cases in order to be adopted in various wireless communication systems. However, since various electronic components other than antennas are also incorporated into such mobile terminals, it is not easy to secure an installation space for the antennas.

In view of this, an aspect of technology in this disclosure has an object of providing an antenna device and electronic equipment capable of reducing an installation space for a plurality of types of antennas as much as possible.

Hereinafter, an embodiment of the present disclosure will be described. The following embodiment shows only an example of the present disclosure and does not intend to limit the technical scope of the present disclosure to the following mode.

Embodiment

Figure 1:
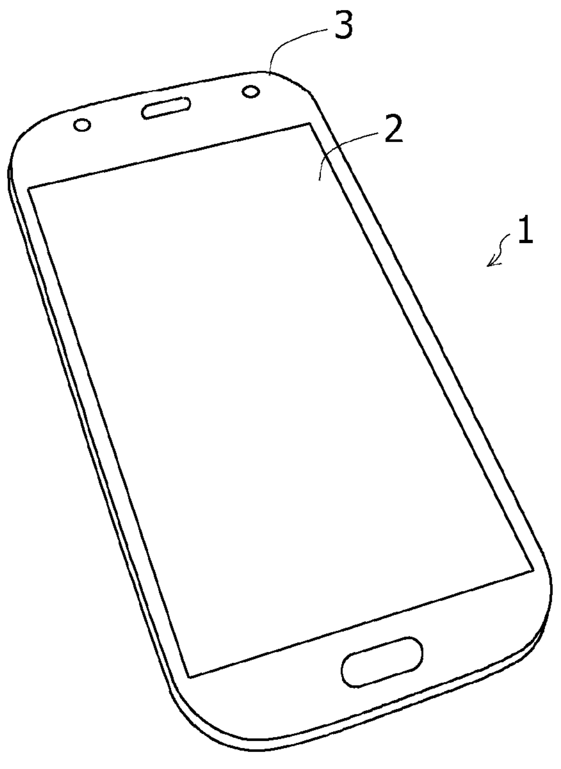
FIG. 1 is an appearance perspective view showing the appearance of a mobile terminal according to an embodiment from a front surface side.

FIG. 1 is an appearance perspective view showing the appearance of a mobile terminal according to the embodiment from a front surface side. A mobile terminal 1 according to the present embodiment is entirely plate-shaped electronic equipment as shown in FIG. 1 and has a display unit 2 and a housing 3 provided with a microphone, a speaker, a terminal, and the like. The present embodiment assumes that a smart phone is an example of the mobile terminal 1, but the mobile terminal 1 may be, for example, a tablet computer having no call function, mobile acoustic equipment, an electronic dictionary, a calculator, and any other types of electronic equipment. Further, the present embodiment may also be applied to unportable desktop computers, household electric products, FA (Factory Automation) sensors, monitoring cameras, and any other types of electronic equipment.

Figure 2:
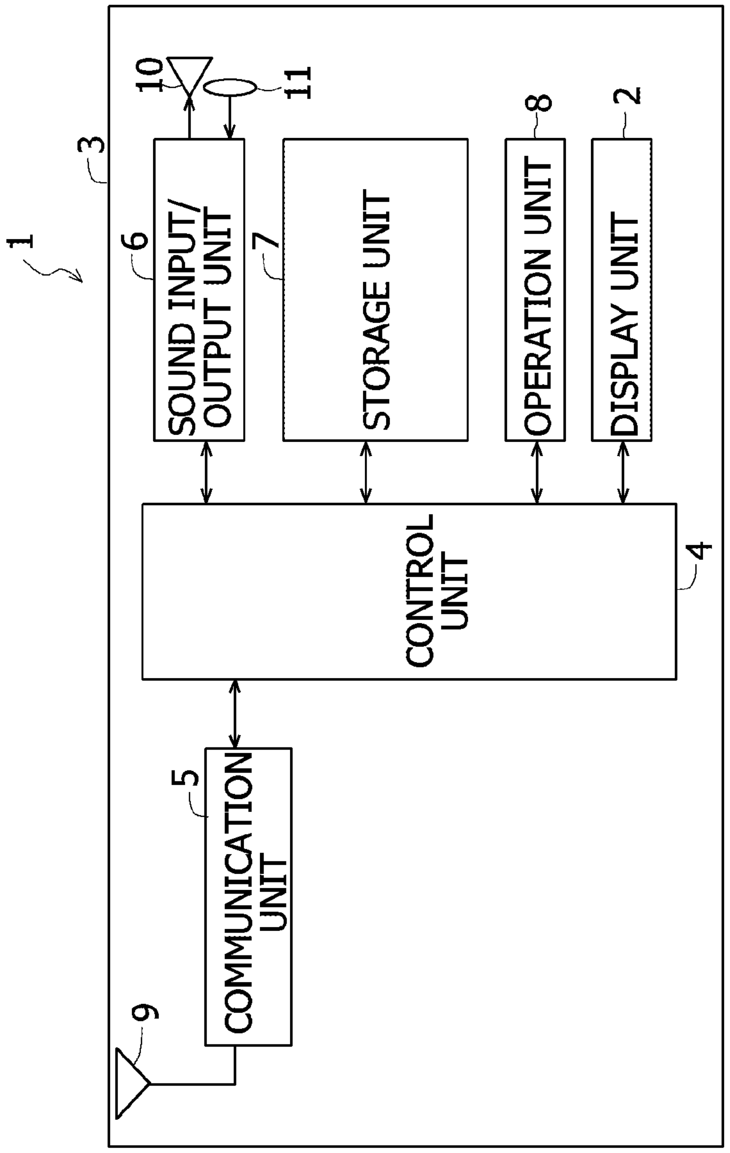
FIG. 2 is a block diagram showing a function configuration example of the mobile terminal.

FIG. 2 is a block diagram showing a function configuration example of the mobile terminal 1. As shown in FIG. 2, the mobile terminal 1 includes a control unit 4, a communication unit 5, a sound input/output unit 6, a storage unit 7, an operation unit 8, an antenna 9, a speaker 10, and a microphone 11, besides the display unit 2. The antenna 9 may form a part of the outer surface of the housing 3 of the mobile terminal 1, or may be incorporated into the housing 3.

The control unit 4 is a processing unit such as a CPU (Central Processing Unit) that controls the entire processing of the mobile terminal 1, and reads a program from the storage unit 7 to execute a process. The control unit 4 executes the process to realize various function blocks and performs, for example, the processing of a display object to be displayed on the display unit 2 or communication-related processing to be executed by the communication unit 5.

The communication unit 5 performs wireless communication with wireless communication equipment such as other mobile machines and base station devices using the antenna 9 under the control of the control unit 4. Specifically, the communication unit 5 performs wireless communication with wireless communication equipment such as other mobile machines and base station devices using a communication system complying with various communication standards such as 5G (fifth-generation mobile communication), 4G (fourth-generation mobile communication), and Wi-Fi (registered trademark, Wireless Fidelity). For example, under the control of the control unit 4 the communication unit 5 performs the transmission and reception of information on web sites selected according to a selecting operation on a web browser and data handled in various other applications via 5G communication, Wi-Fi communication, or the like.

The sound input/output unit 6 outputs sound input through the control unit 4 from the speaker 10. Further, the sound input/output unit 6 collects sound from the microphone 11 and outputs the collected sound to the control unit 4.

The storage unit 7 is a storage device such as a memory and an SSD (Solid State Drive). The storage unit 7 stores a computer program and data.

The operation unit 8 has a touch panel, operation keys, or the like overlappingly disposed on the display screen of the display unit 2. The operation unit 8 receives various inputs from a user and outputs the received inputs to the control unit 4. The display unit 2 is a liquid-crystal screen or the like and displays various information on the display screen under the control of the control unit 4.

The configuration of the mobile terminal 1 is described above. Next, the details of the antenna 9 will be described. As described above, the mobile terminal 1 of the present embodiment performs wireless communication with other mobile machines or base station devices using a communication system complying with various communication standards such as 5G, 4G, and Wi-Fi. Accordingly, the antenna 9 includes a plurality of types of antennas to correspond to various frequency bands.

Figure 3:
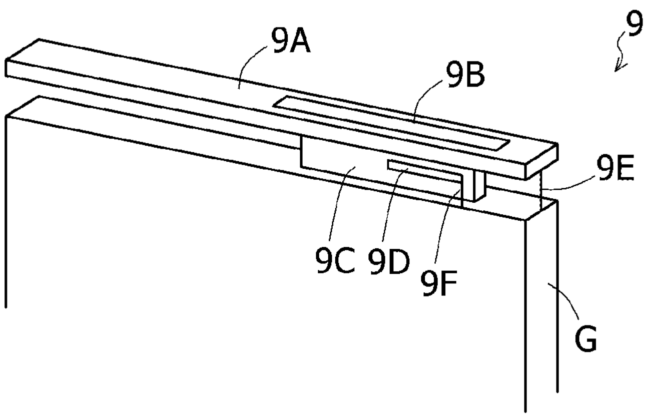
FIG. 3 is a perspective view of an antenna according to the embodiment.

FIG. 3 is a perspective view of the antenna 9 according to the embodiment. As shown in FIG. 3, the antenna 9 includes an LTE antenna 9A, a Sub6 antenna 9B, a millimeter wave antenna 9C, a metal element 9D, a feeder wire 9E, and a feeder wire 9F. Note that FIG. 3 shows only parts of the antenna 9 and omits the illustration of a peripheral part such as a mold resin.

The antenna 9 is provided at the end of a ground G. The ground G is a rectangular metal layer kept at a ground potential and realized by a thin film-shaped metal layer such as copper foil. The ground G is shown as a rectangular plate shape in FIG. 3 so as to be a portion recognizable as being electromagnetically grounded. However, the ground G is actually a metal layer arranged on a wiring substrate on which various electronic components are mounted.

The LTE antenna 9A is a rod-shaped antenna made of a slender plate-shaped metal material. The LTE antenna 9A has a length (70 mm) corresponding to the frequency of 4G (that is an example of a "first frequency" in the present specification) and suitably has a length nearly one fourth of its wavelength. The LTE antenna 9A extends along the edge of the ground G at a position away from the ground G by a prescribed distance (5 mm). The LTE antenna 9A is configured such that the feeder wire 9E connected from the ground G to the LTE antenna 9A is connected to one end portion in the longitudinal direction of the LTE antenna 9A. When power is fed by a coaxial cable, the shield wire of the feeder wire 9E is connected to the ground G and the core wire thereof is connected to the LTE antenna 9A at a feed point. Accordingly, the LTE antenna 9A functions as a monopole antenna. The LTE antenna 9A is a plate-shaped metal material. Therefore, when the antenna 9 forms a part of the outer surface of the housing 3 of the mobile terminal 1, the LTE antenna 9A may form the exterior surface of the housing 3.

The Sub6 antenna 9B is a slot antenna formed by a slot penetrating the LTE antenna 9A that is a plate-shaped metal material. The Sub6 antenna 9B is formed by the slot extending along the longitudinal direction of the LTE antenna 9A. Accordingly, the length (slot length) in the longitudinal direction of the slot forming the Sub6 antenna 9B is inevitably shorter than the length in the longitudinal direction of the LTE antenna 9A. Accordingly, the Sub6 antenna 9B corresponds to higher frequencies than the LTE antenna 9A. The length of the slot is suitably set to be nearly one second of its wavelength. In the present embodiment, a resin having a dielectric constant of 3.0 is filled in the slot having a length of 30 mm and a width of 3.6 mm to form the slot antenna of the Sub6 antenna 9B in order to correspond to the Sub6 frequency band of 5G higher in frequency than 4G with the Sub6 antenna 9B.

The millimeter wave antenna 9C is an antenna module in which an antenna and other elements are integrated with each other. The millimeter wave antenna 9C is an antenna module smaller in the longitudinal direction than the Sub6 antenna 9B as shown in FIG. 3 and corresponds to the millimeter wave frequency band of 5G. Since radio waves in a millimeter wave band have significantly high directivity, the millimeter wave antenna 9C is arranged in a direction in which the main radiating direction of the millimeter wave antenna 9C is oriented toward an upper part in the space of FIG. 3 via the inside of the Sub6 antenna 9B in the present embodiment.

The antenna 9 includes the three types of antennas, i.e., the LTE antenna 9A, the Sub6 antenna 9B, and the millimeter wave antenna 9C as described above and is capable of corresponding to wide frequency bands. Accordingly, the mobile terminal 1 is allowed to select an optimum communication system according to a communication environment by appropriately switching the three types of antennas provided in the antenna 9.

Meanwhile, the Sub6 antenna 9B is formed in a metal material constituting the LTE antenna 9A as described above. Accordingly, the LTE antenna 9A is not capable of functioning as an antenna when a feeder wire is directly connected to the Sub6 antenna 9B. Therefore, the feeding path of the Sub6 antenna 9B is configured as follows in the antenna 9 of the present embodiment.

That is, the antenna 9 includes the metal element 9D and the feeder wire 9F as shown in FIG. 3. The metal element 9D is a metal element for electromagnetic field coupling arranged in a non-contact state with respect to the slot antenna constituting the Sub6 antenna 9B between the Sub6 antenna 9B and the ground G. Accordingly, the metal element 9D is arranged at a position separated from both the LTE antenna 9A and the ground G as shown in FIG. 3. Further, the feeder wire 9F is connected to the end of the metal element 9D. The feeder wire 9F is connected to a high-frequency circuit provided in the ground G. The high-frequency circuit constitutes the communication unit 5.

Figure 4:
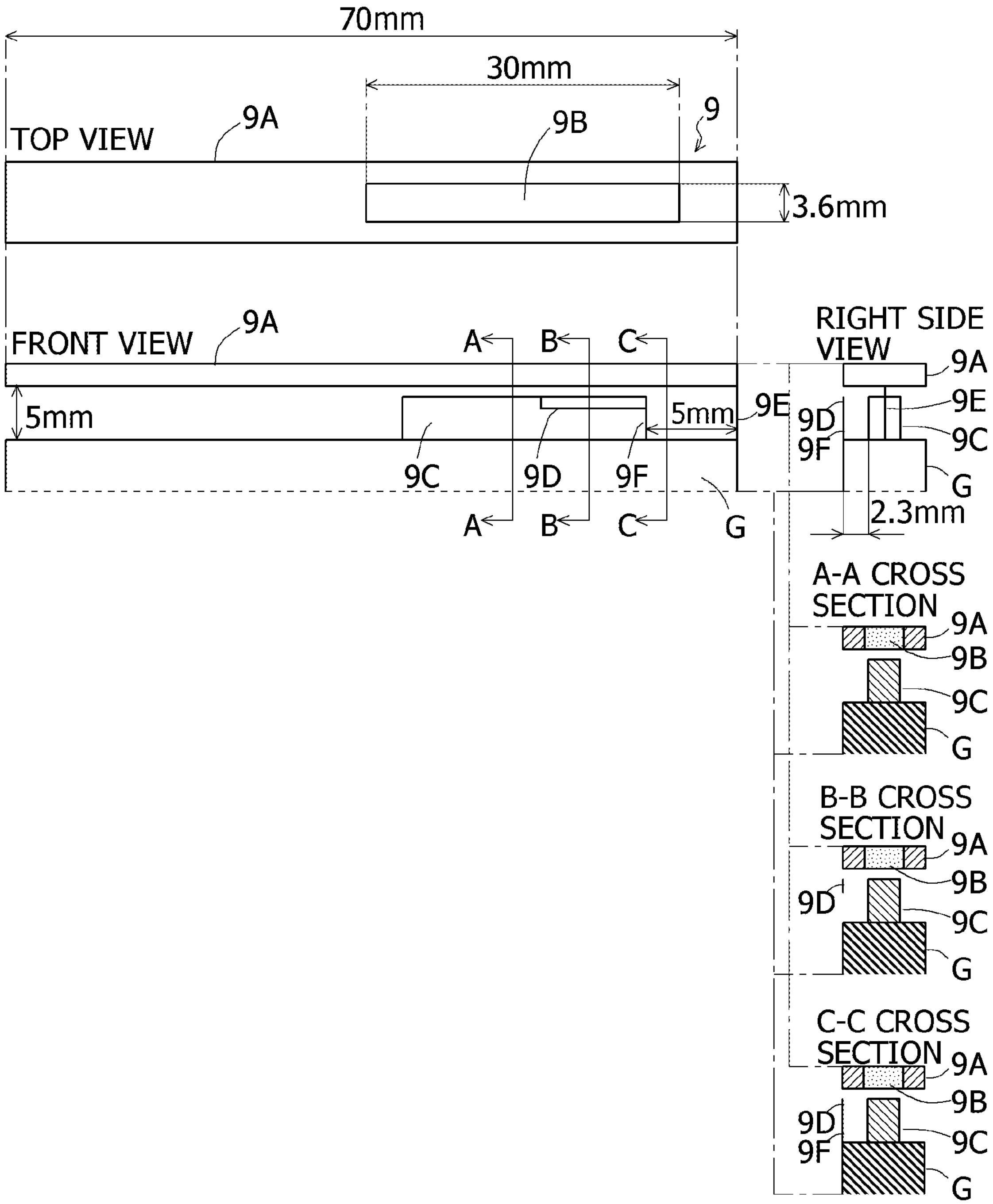
FIG. 4 is a diagram showing the positional relationship of a metal element.

FIG. 4 is a diagram showing the positional relationship of the metal element 9D. The metal element 9D is metal extending along the longitudinal direction of the slot constituting the Sub6 antenna 9B. Further, the metal element 9D is arranged at a position closer to one side than the other side among two long sides forming the edge of the opening portion of the slot. Accordingly, the metal element 9D extends along the one side among the two long sides forming the edge of the opening portion of the slot.

When power is supplied to the metal element 9D from the feeder wire 9F connected to the end of the metal element 9D, the metal element 9D functions as a power transmission side electrode in an electromagnetic field coupling system and generates an electric field between the slot constituting the Sub6 antenna 9B and the metal element 9D. Further, the slot constituting the Sub6 antenna 9B functions as a power reception side electrode in the electromagnetic field coupling system, and the Sub6 antenna 9B transmits the power of the feeder wire 9F in the form of radio waves.

Further, when the Sub6 antenna 9B catches radio waves, the slot constituting the Sub6 antenna 9B functions as a power transmission side electrode in the electromagnetic field coupling system and generates an electric field between the slot constituting the Sub6 antenna 9B and the metal element 9D. Further, the metal element 9D functions as a power reception side electrode in the electromagnetic field coupling system and feeds the power of radio waves caught by the Sub6 antenna 9B to the feeder wire 9F.

Note that an appropriate rectification circuit is provided in a high frequency circuit connected to the feeder wire 9F so that resonance with appropriate strength occurs between the slot constituting the Sub6 antenna 9B and the metal element 9D in the power of the Sub6 frequency band transmitted and received by the Sub6 antenna 9B.

The antenna 9 configured as described above allows the LTE antenna 9A, the Sub6 antenna 9B, and the millimeter wave antenna 9C to function as antennas. That is, the LTE antenna 9A performs the transmission and reception of radio waves corresponding to 4G frequencies. Further, the Sub6 antenna 9B performs the transmission and reception of radio waves corresponding to Sub6 frequencies. Further, the millimeter wave antenna 9C performs the transmission and reception of radio waves of millimeter bands via the slot constituting the Sub6 antenna 9B. Moreover, the metal element 9D itself is caused to function as a monopole antenna so that the metal element 9D itself is capable of performing the transmission and reception of radio waves of different frequency bands.

Simulation

A result obtained when a simulation was performed by an electromagnetic field simulator with the provision of an analysis model corresponding to the antenna 9 of the above embodiment is shown below.

As shown in FIG. 4, the length of the LTE antenna 9A was 70 mm, the distance between the LTE antenna 9A and the ground G was 5 mm, the distance between the feeder wire 9E and the millimeter wave antenna 9C was 5 mm, the length in the longitudinal direction of the slot forming the Sub6 antenna 9B was 30 mm, and the length in the short direction of the slot forming the Sub6 antenna 9B was 3.6 mm in the analysis model. Further, a dielectric material having a specific inductive capacity (Er) of 3.0 was filled in the slot forming the Sub6 antenna 9B. Further, the metal element 9D was separated from the millimeter wave antenna 9C by 2.3 mm.

Figure 5:
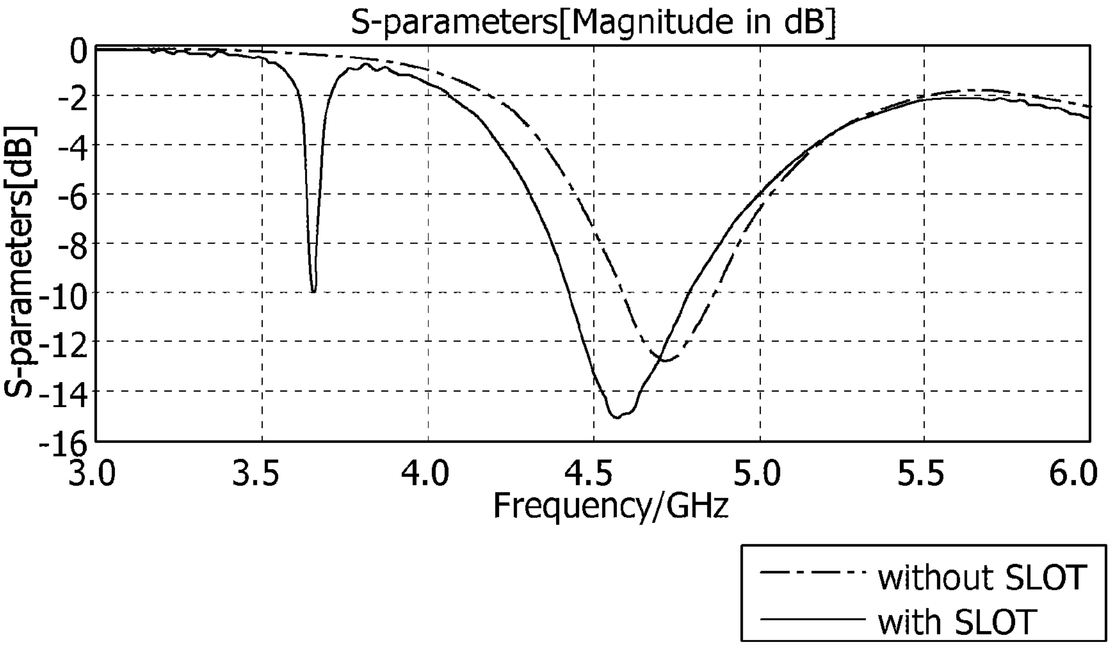
FIG. 5 is a graph showing S-parameters in the embodiment.
Figure 6:
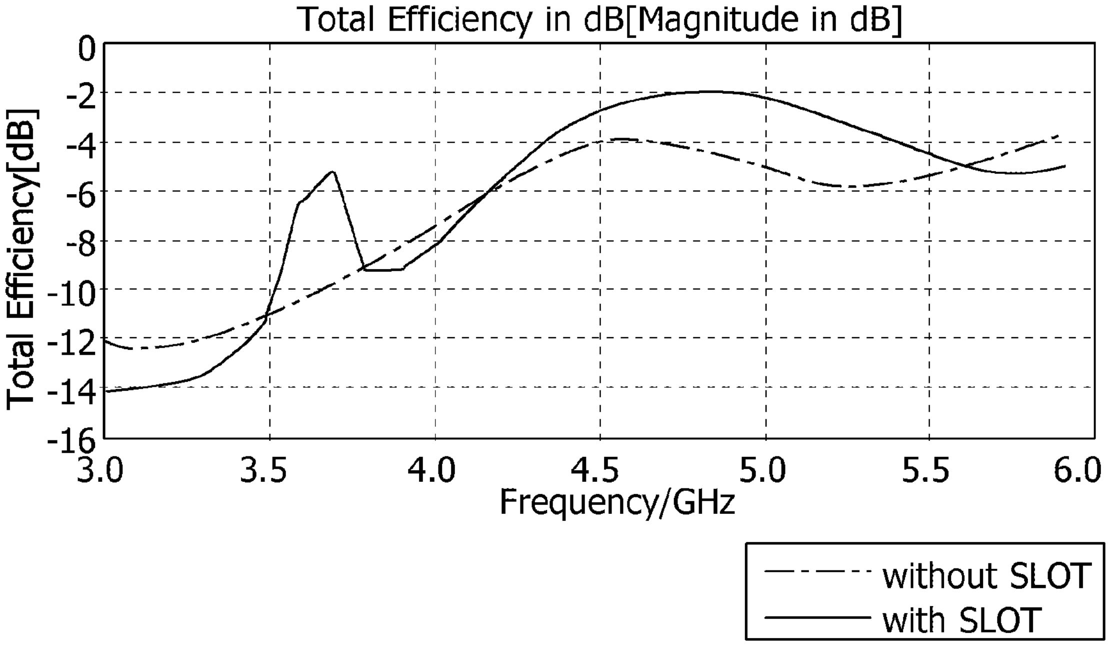
FIG. 6 is a graph showing total efficiency in the embodiment.

In the analysis, a study to determine whether resonance occurs in the slot forming the Sub6 antenna 9B with the supply of power in an electromagnetic field coupling system from the metal element 9D to the Sub6 antenna 9B was first conducted. FIG. 5 is a graph showing S-parameters in the embodiment. Further, FIG. 6 is a graph showing total efficiency in the embodiment.

It is understood from the graph of FIG. 5 that a reduction in the S-parameters that does not occur when the slot is not provided in the LTE antenna 9A is found near 3.7 GHz when the slot forming the Sub6 antenna 9B is provided in the LTE antenna 9A. Further, it is understood from the graph of FIG. 6 that an about 5 dB increase in the total efficiency that does not occur when the slot is not provided in the LTE antenna 9A is found near 3.7 GHz when the slot forming the Sub6 antenna 9B is provided in the LTE antenna 9A. Accordingly, it is understood from the analysis model that resonance occurs between the slot of the Sub6 antenna 9B and the metal element 9D at a frequency of 3.7 GHz assigned to a Sub6 band in 5G, and that power radiated from the metal element 9D as a reverse L-type antenna is feedable to the slot of the Sub6 antenna 9B.

Figure 7A:
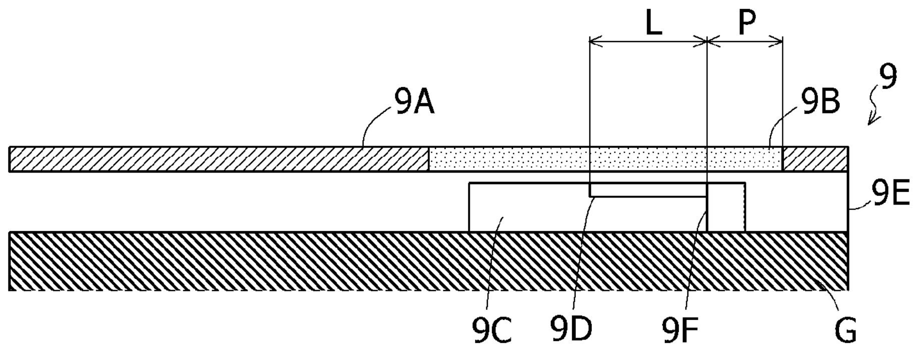
FIG. 7A is a diagram showing the relationship between the power feeding position and the element length of a metal element.
Figure 7B:
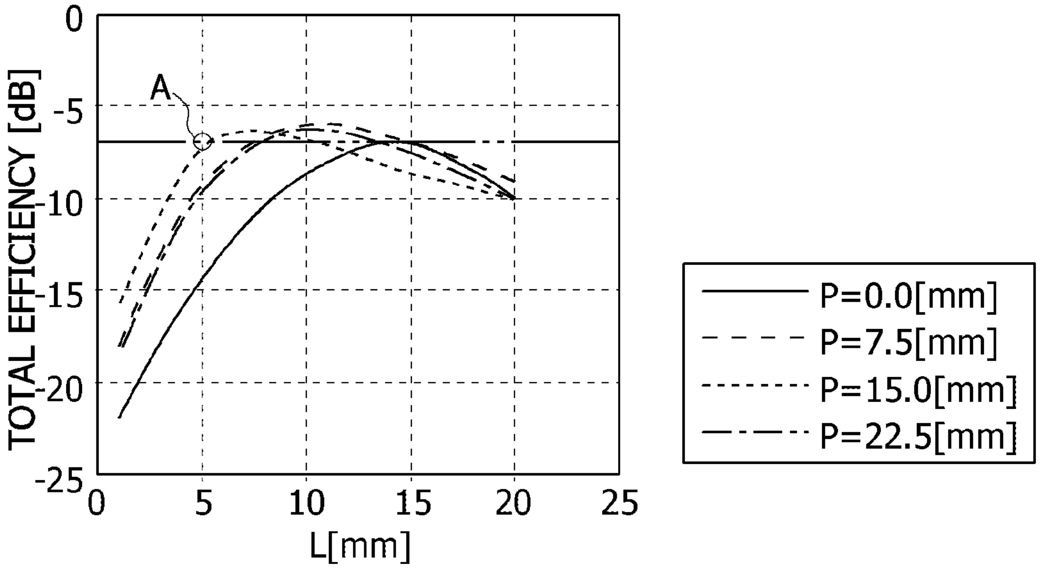
FIG. 7B is a graph showing the relationship between the power feeding position and the element length of a metal element and the total efficiency at a frequency of 3.7 GHz.

In the analysis, a study to determine the relationship between the power feeding position and the element length of the metal element 9D and the total efficiency was next conducted. FIG. 7A is a diagram showing the relationship between the power feeding position and the element length of a metal element. FIG. 7B is a graph showing the relationship between the power feeding position and the element length of the metal element 9D and the total efficiency at a frequency of 3.7 GHz. Symbol P shown in FIG. 7A denotes the length from one end in the longitudinal direction of the slot forming the Sub6 antenna 9B to the feeder wire 9F. Further, symbol L shown in FIG. 7A denotes the length (element length) of the metal element 9D. It is understood from the graph of FIG. 7B that the element length L is preferably set at about 15 mm to maximize the total efficiency when the feeder wire 9F is arranged near one end in the longitudinal direction of the slot, i.e., when the feeder wire 9F is arranged so that the length P is equal to 0.0 mm. When the total efficiency of the same degree is obtained with the feeder wire 9F arranged near the center in the longitudinal direction of the slot, i.e., with the feeder wire 9F arranged so that the length P is equal to 15.0 mm, it is understood from a two-dot chain line and symbol A in the graph of FIG. 7B that the element length L is set at about 5.0 mm only. That is, the element length of the metal element 9D may be reduced to about one third. Accordingly, it is understood from the simulation that a reduction in the element length of the metal element 9D is made possible when the feeder wire 9F is provided near the center in the longitudinal direction of the slot rather than being provided near one end in the longitudinal direction of the slot.

It is understood from the above simulation that the slot provided in the LTE antenna 9A is capable of functioning as the Sub6 antenna 9B in the antenna 9 of the present embodiment. Accordingly, the antenna 9 of the present embodiment nearly integrally forms the two types of antennas, i.e., the LTE antenna 9A and the Sub6 antenna 9B and allows the radio waves of the millimeter wave antenna 9C to pass through via the slot forming the Sub6 antenna 9B.

Therefore, the antenna 9 is capable of reducing an installation space for a plurality of types of antennas as much as possible. For example, in a case in which a plurality of types of antennas having different frequency bands are incorporated to correspond to various wireless communication systems like smart phones, the use of the antenna 9 of the present embodiment facilitates the securement of an installation space for the antennas while maintaining wireless properties since the antenna 9 is capable of reducing the installation space for the antennas as much as possible.

First Modified Example

Figure 8:
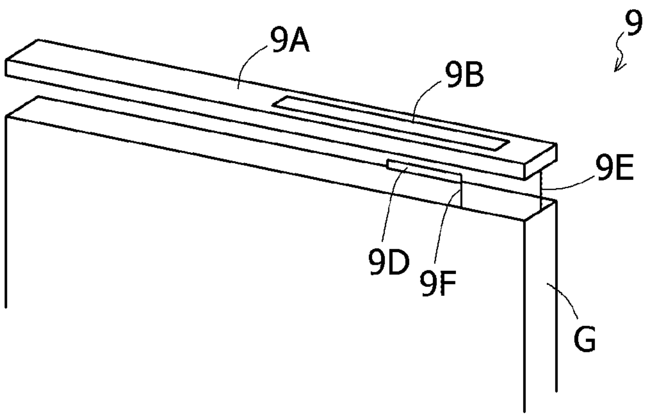
FIG. 8 is a perspective view of an antenna according to a first modified example.

Note that the antenna 9 of the above embodiment may be one from which the millimeter wave antenna 9C is removed. FIG. 8 is a perspective view of an antenna 9 according to a first modified example. The antenna 9 according to the first modified example is the same as the antenna 9 according to the above embodiment except that a millimeter wave antenna 9C is removed. The antenna 9 according to the first modified example also nearly integrally forms the two types of antennas, i.e., an LTE antenna 9A and a Sub6 antenna 9B like the above embodiment and thus is capable of reducing an installation space for a plurality of types of antennas as much as possible.

Second Modified Example

Figure 9:
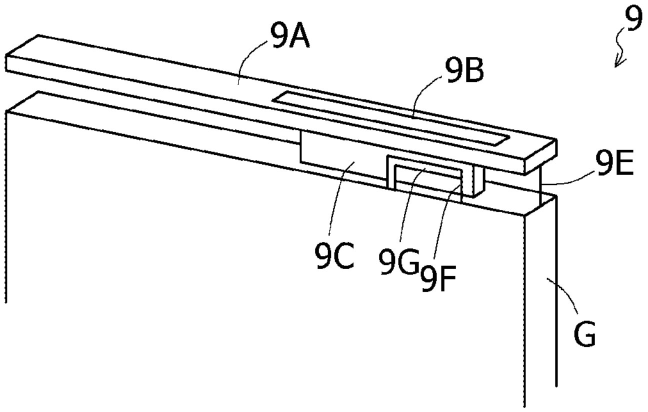
FIG. 9 is a perspective view of an antenna according to a second modified example.

Further, the antenna 9 of the above embodiment may be one in which the metal element 9D of the above embodiment is not formed into a monopole shape but is formed into a loop shape. FIG. 9 is a perspective view of an antenna 9 according to a second modified example. In the antenna 9 according to the second modified example, a reverse L-shaped metal element 9G obtained by making an end on a side not connected to a feeder wire 9F of a metal element 9D short-circuited to a ground G is provided instead of the metal element 9D. The other configurations are the same as those of the above embodiment.

A result obtained when a simulation was performed by an electromagnetic field simulator with the provision of an analysis model corresponding to the second modified example will be shown below.

Figure 10:
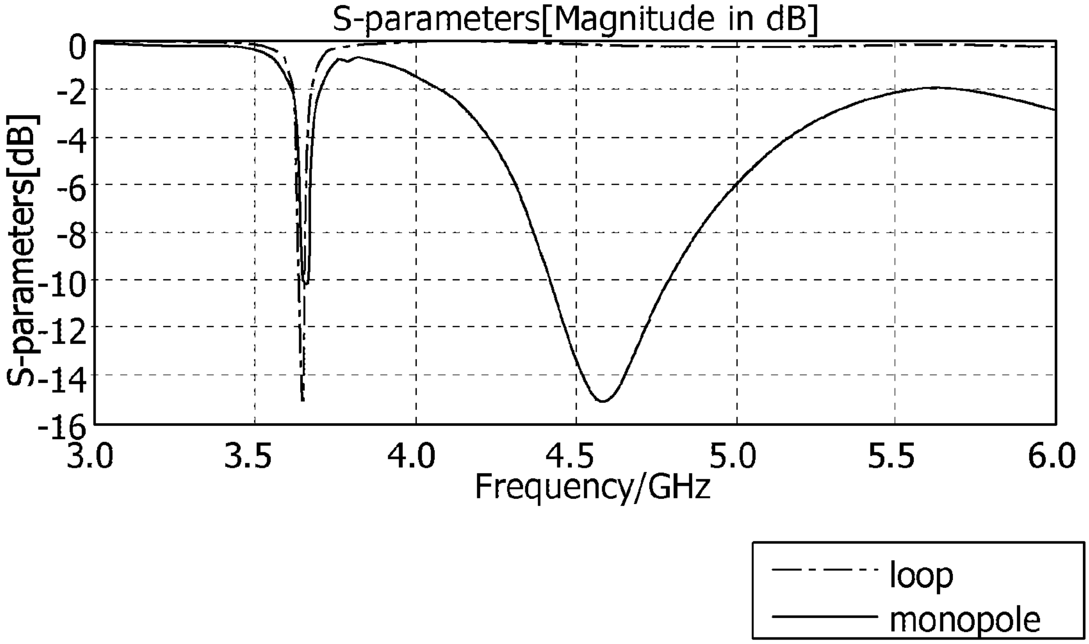
FIG. 10 is a graph showing S-parameters in the second modified example.
Figure 11:
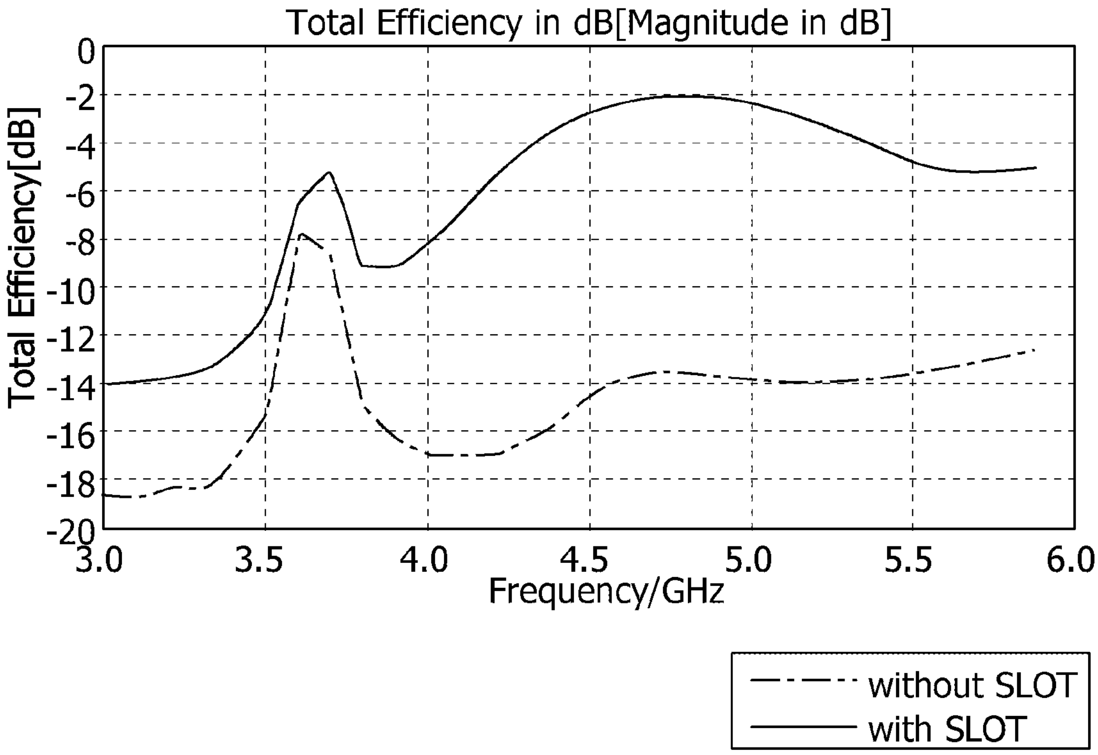
FIG. 11 is a graph showing total efficiency in the second modified example.

The analysis model corresponding to the second modified example is the same as the analysis model corresponding to the antenna 9 of the above embodiment except that the metal element 9D is replaced by the metal element 9G that does not have the monopole shape but has the loop shape. Accordingly, the descriptions of the dimensions of respective parts or the like will be omitted. FIG. 10 is a graph showing S-parameters in the second modified example. Further, FIG. 11 is a graph showing total efficiency in the second modified example.

It is understood from the graph of FIG. 10 that a significant reduction in the S-parameters is found near 3.7 GHz like the analysis model of the above embodiment even if the metal element 9G having the loop shape is used instead of the metal element 9D having the monopole shape. Further, it is understood from the graph of FIG. 11 that a significant increase in the total efficiency is found near 3.7 GHz. Accordingly, it is understood that resonance occurs between the slot of a Sub6 antenna 9B and the metal element 9G at a frequency of 3.7 GHz assigned to a Sub6 band in 5G and power radiated from the metal element 9G is feedable to the slot of the Sub6 antenna 9B in the analysis model of the second modified example as well.

Third Modified Example

Figure 12:
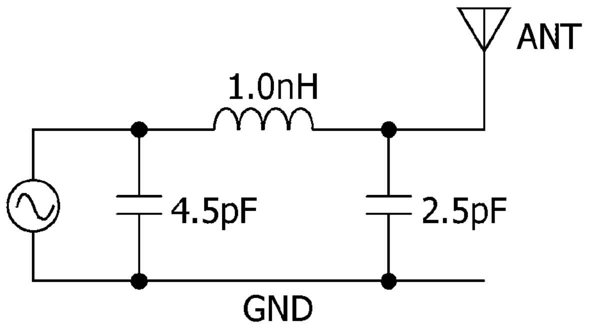
FIG. 12 is a schematic diagram showing an example of a rectification circuit.

Meanwhile, a rectification circuit is not described in the above embodiment and the modified examples. However, in order to amplify power radiated from the metal elements 9D and 9G, the metal elements 9D and 9G may be provided with, for example, the following rectification circuit. FIG. 12 is a schematic diagram showing an example of the rectification circuit. ANT shown in FIG. 12 corresponds to the metal elements 9D and 9G.

The metal elements 9D and 9G have low impedance. Therefore, in order to make high-frequency power generated by a high-frequency circuit efficiently radiated from the metal element 9D and 9G, the rectification circuit in which an inductor is inserted in series and capacitors are inserted in parallel may be provided as shown in, for example, FIG. 12. The size (1.0 nH) of the inductor and the sizes (4.5 pF, 2.5 pF) of the capacitors illustrated in FIG. 12 show an example. The rectification circuits provided in the above embodiment and the modified example are not limited to those constituted by the inductor and the capacitors of these sizes.

Figure 13:
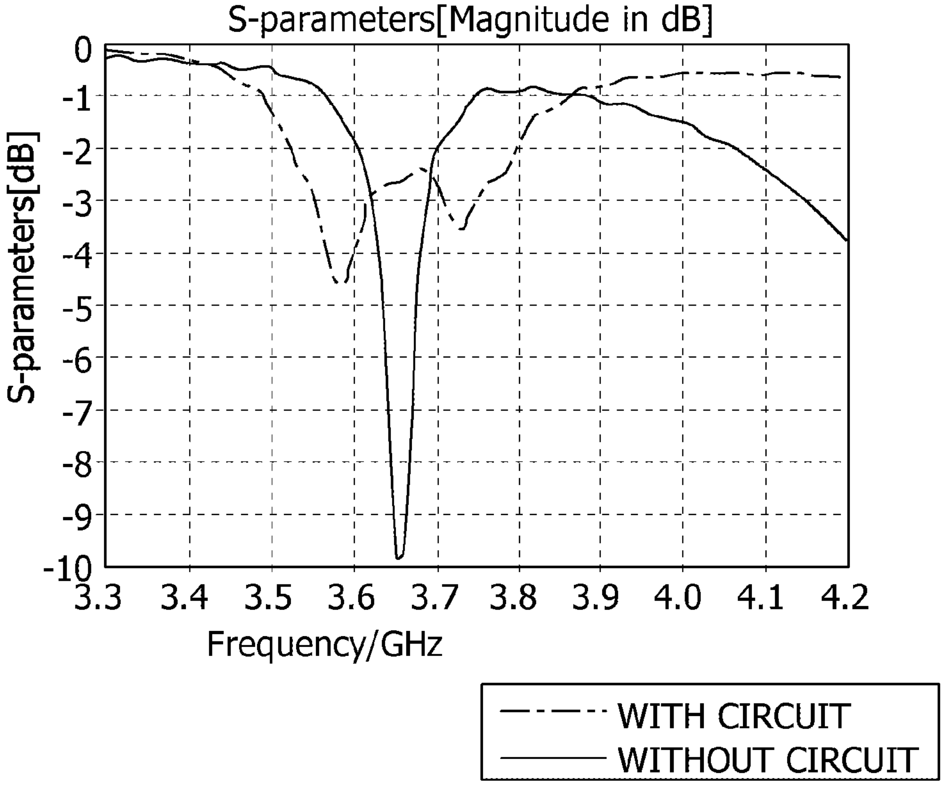
FIG. 13 is a graph showing S-parameters in a third modified example.

FIG. 13 is a graph showing S-parameters in the third modified example. When the metal elements 9D and 9G are provided with an appropriate rectification circuit, it is possible to strengthen the electromagnetic field coupling between the metal elements 9D and 9G and a Sub6 antenna 9B since power output from the metal elements 9D and 9G increases. Accordingly, the S-parameters are improved as shown in FIG. 13.

Other Modified Examples

The descriptions of the above embodiment and the respective modified examples assume the use of the antennas in the frequency bands of 4G, Sub6, or the like, but the antennas are applicable in other frequency bands. The above embodiment and the respective modified examples are not limited to the dimensions or the shapes illustrated as described above but appropriate dimensions, shapes, or the like are employable.

With the disclosed technology, it is possible to reduce an installation space for a plurality of types of antennas as much as possible.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna device comprising:

a first antenna having a length corresponding to a first frequency, and arranged along a ground;

a second antenna formed by a slot penetrating metal constituting the first antenna, and having a slot length corresponding to a second frequency higher than the first frequency;

a first feeder wire for the first frequency, connected from the ground to the first antenna;

a metal element for electromagnetic field coupling, arranged in a non-contact state relative to the second antenna, between the slot and the ground; and a second feeder wire for the second frequency, connected from the ground to the metal element.

2. The antenna device according to claim 1, wherein the metal element is metal extending along a longitudinal direction of the slot.

3. The antenna device according to claim 1, wherein the first antenna has a length one fourth of a wavelength corresponding to the first frequency, and the second antenna has a length one half of a wavelength corresponding to the second frequency.

4. The antenna device according to claim 1, wherein the metal element is arranged at a position closer to one side than another side from among two long sides forming an edge of an opening portion of the slot.

5. The antenna device according to claim 1, wherein the metal element has a monopole shape, in which the second feeder wire is connected to only one of both ends in a longitudinal direction thereof.

6. The antenna device according to claim 1, wherein the metal element has a loop shape.

7. The antenna device according to claim 1, wherein the second feeder wire is connected to the metal element near a center of the slot in a longitudinal direction thereof.

8. The antenna device according to claim 1, wherein the metal element has one end in the longitudinal direction at a position near the center of the slot in the longitudinal direction thereof.

9. The antenna device according to claim 1, wherein the metal element is connected to the second feeder wire via a rectification circuit.

10. The antenna device according to claim 1, wherein a dielectric material is filled in the slot.

11. The antenna device according to claim 1, further comprising a third antenna arranged between the slot and the ground so that a main radiating direction thereof is oriented toward the slot.

12. Electronic equipment comprising the antenna device according to claim 1.

13. The electronic equipment according to claim 12, further comprising a housing partially formed of metal constituting the first antenna.

* * * * *